United States Patent
Hashimoto

(10) Patent No.: US 9,477,360 B2
(45) Date of Patent: Oct. 25, 2016

(54) POSITION SENSING METHOD OF TOUCH PANEL AND INTEGRATED CIRCUIT

(75) Inventor: Masashi Hashimoto, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 68 days.

(21) Appl. No.: 14/381,647

(22) PCT Filed: Jun. 29, 2012

(86) PCT No.: PCT/KR2012/005215
§ 371 (c)(1),
(2), (4) Date: Aug. 28, 2014

(87) PCT Pub. No.: WO2013/129742
PCT Pub. Date: Sep. 6, 2013

(65) Prior Publication Data
US 2015/0054777 A1    Feb. 26, 2015

(30) Foreign Application Priority Data

| Feb. 29, 2012 | (KR) | 10-2012-0021097 |
| Feb. 29, 2012 | (KR) | 10-2012-0021098 |
| Apr. 5, 2012 | (KR) | 10-2012-0035670 |
| Jun. 26, 2012 | (KR) | 10-2012-0068830 |

(51) Int. Cl.
G06F 3/044 (2006.01)
G06F 3/041 (2006.01)

(52) U.S. Cl.
CPC .......... G06F 3/044 (2013.01); G06F 3/0412 (2013.01)

(58) Field of Classification Search
CPC ...... G06F 3/044; G06F 3/0412; G06F 3/041; G06F 3/0416; G06F 3/0418
See application file for complete search history.

(56) References Cited

U.S. PATENT DOCUMENTS

| 6,738,048 B1 | 5/2004 | Rundel | 345/173 |
| 8,432,374 B2 * | 4/2013 | Yang | G06F 3/0416 178/18.06 |
| 2007/0285404 A1 * | 12/2007 | Rimon | G06F 3/0416 345/173 |
| 2009/0153152 A1 * | 6/2009 | Maharyta | G01R 27/2605 324/684 |
| 2010/0020032 A1 | 1/2010 | Mamba et al. | 345/173 |
| 2010/0117981 A1 | 5/2010 | Chen et al. | 345/174 |
| 2010/0315363 A1 * | 12/2010 | Kobayashi | G06F 3/044 345/173 |
| 2010/0328255 A1 * | 12/2010 | Ishizaki | G06F 3/044 345/174 |
| 2011/0109585 A1 * | 5/2011 | Kwon | G06F 3/0418 345/174 |
| 2011/0115733 A1 | 5/2011 | Shih | 345/173 |
| 2012/0001865 A1 | 1/2012 | Chen et al. | 345/174 |
| 2012/0075237 A1 * | 3/2012 | Ikeda | G06F 3/044 345/174 |
| 2012/0086672 A1 * | 4/2012 | Tseng | G06F 3/0421 345/175 |
| 2012/0098790 A1 | 4/2012 | Han | 345/174 |
| 2013/0063390 A1 * | 3/2013 | Kwon | G06F 3/044 345/174 |
| 2013/0141372 A1 * | 6/2013 | Kang | G06F 3/041 345/173 |

FOREIGN PATENT DOCUMENTS

KR    10-1076236 B1    10/2011

OTHER PUBLICATIONS

Panupong Sornkhom, "Digital Circuit and Logic Design I", 2005.*
International Search Report dated Feb. 1, 2013 issued in Application No. PCT/KR2012/005215.

* cited by examiner

Primary Examiner — Quan-Zhen Wang
Assistant Examiner — Dong Hui Liang
(74) Attorney, Agent, or Firm — Ked & Associates LLP

(57) ABSTRACT

Disclosed is a touch panel. The touch panel includes a touch screen provided therein with a plurality of X electrode lines and a plurality of Y electrode lines which cross each other, and a plurality of comparators connected between first and second Y electrode lines adjacent to each other. The touched position on the touch screen is detected according to an output code formed by using output values of the comparators.

6 Claims, 9 Drawing Sheets

POSITION SENSING METHOD OF TOUCH PANEL AND INTEGRATED CIRCUIT

CROSS-REFERENCE TO RELATED PATENT APPLICATIONS

This application is a U.S. National Stage Application under 35 U.S.C. 5371 of PCT Application No. PCT/KR2012/005215, filed Jun. 29, 2012, which claims priority to Korean Patent Application Nos. 10-2012-0021097 and 10-2012-0021098, both filed Feb. 29, 2012, 10-2012-0035670 filed Apr. 5, 2012 and 10-2012-0068830 filed Jun. 26, 2012, whose entire disclosures are hereby incorporated by reference.

TECHNICAL FIELD

The disclosure relates to a method of detecting a touched position of a capacitive touch panel and an integrated circuit.

BACKGROUND ART

In general, a personal computer, portable communication equipment, and other personal information processing devices construct an interface with a user through various input devices such as a keyboard, a mouse, and a digitizer.

Meanwhile, as the usage of the personal computer is expanded, the degree of the finishing of the product may not be enhanced only by using the keyboard and the mouse. Accordingly, the demand for a portable input device having a simpler structure while reducing an erroneous operation is gradually increased as time elapses.

In order to meet the demand, there is suggested a touch panel in which a user directly touches a screen by using the hand of the user or a pen to input information. The touch panel has a simple structure, represents less erroneous operations, and can be easily carried. In addition, the touch panel enables a user to input characters without other input devices and to easily learn how to use the touch panel. Recently, due to the advantages, the touch panel has been applied to various information processing devices.

In order to detect the coordinates of a touched position, such touch panels are classified into a resistive-type touch panel to determine the touched position based on voltage gradient varied according to resistances in the state that metallic electrodes are provided on top and bottom plates and DC voltage is applied to the metallic electrodes, a capacitive-type touch panel to detect a position having voltage variation between the top and bottom plates according to the touch by forming equipotential in a conductive film, or an electro-magnetic-type touch panel to detect the touched position by reading an LC value induced as an electronic pen touches a conductive film

DISCLOSURE OF INVENTION

Technical Problem

The disclosure provides a method of detecting a touched position of a capacitive-type touch panel capable of reducing noise and an integrated circuit.

Solution to Problem

According to one embodiment of the disclosure, there is provided a touch panel. The touch panel includes a touch screen provided therein with a plurality of X electrode lines and a plurality of Y electrode lines which cross each other, and a plurality of comparators connected between first and second Y electrode lines adjacent to each other. The touched position on the touch screen is detected according to an output code formed by using output values of the comparators.

According to the embodiment of the disclosure, there is provided a method of detecting a position of a touch panel. The method includes inputting a position signal of a pair of adjacent Y electrode lines, which are selected among a plurality of X electrode lines and a plurality of Y electrode lines crossing each other and varied according to a touched position, into at least one comparator connected between the pair of the adjacent Y electrode lines, inputting a predetermined addition signal into the at least one comparator, and detecting the touched position by comparing the position signal with the addition signal by the at least one comparator.

According to the embodiment of the disclosure, there is provided an integrated circuit. The integrated circuit includes a plurality of comparators having a plurality of input terminals to receive an addition signal and a position signal varied according to a touched position and an output terminal to output a comparative signal of the position signal and the addition signal, and an operating part to generate a position signal by reading the comparative signal out of each comparator.

Advantageous Effects of Invention

As described above, the embodiment of the disclosure can provide a method of detecting a touched position of a capacitive touch panel and an integrated circuit, in which noise can be reduced and improved efficiency can be represented by detecting a touched position according to the output values of plural comparators connected between Y electrode lines adjacent to each other.

MODE FOR THE INVENTION

Hereinafter, a touch panel according to the embodiment of the disclosure will be described in detail with reference to accompanying drawings.

Figure 1:
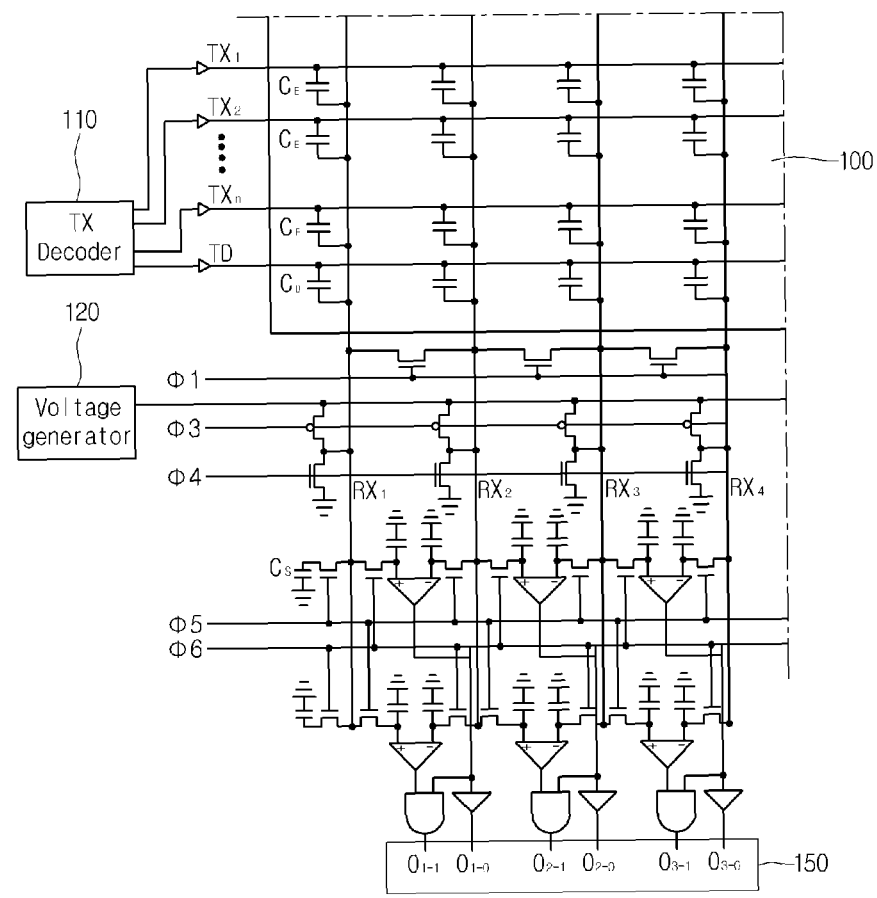
FIG. 1 is a circuit diagram showing the structure of a touch panel according to a first embodiment of the disclosure.

FIG. 1 is a circuit diagram showing the structure of a touch panel according to a first embodiment of the disclosure.

Referring to FIG. 1, the touch panel may include a touch screen 100 having a plurality of X electrode lines $TX_1$ to $TX_n$ and a plurality of Y electrode lines $RX_1$ to $RX_m$ crossing each other on a transparent substrate while interposing an insulating layer therebetween.

A touched position on the touch panel 100 may be detected by detecting the variation state in capacitance between the X electrode lines $TX_1$ to $TX_n$ and the Y electrode lines $RX_1$ to $RX_m$ and determining the touch state at a related part of the touch panel 100.

Figure 2:
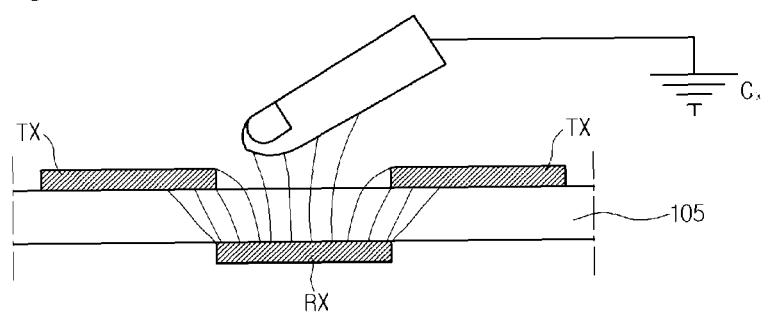
FIG. 2 is a view showing the variation of the capacitance according the touch of an object.

Referring to FIG. 2, when the finger of a user touches a specific position on the touch screen 100, an effective value of a coupling capacitor may be reduced by a specific value (e.g., $C_M$) at a cross point between the X electrode line and the Y electrode line corresponding to the touched position.

Meanwhile, as shown in FIG. 1, the touch panel may include electronic parts used to detect the touched position on the touch screen 100. If the electronic parts constitute an on-cell touch panel, the electronic parts may be realized in an IC chip separated from the touch screen 100. If the electronic parts constitute an in-cell touch panel, the electronic parts may be realized on the same film as that of the electrode lines on the touch screen 100.

In addition, according to the embodiment of the disclosure, a plurality of comparators are connected between two adjacent Y electrode lines, and the touched position on the touch screen 100 may be detected according to output codes formed by using the output values of the comparators.

In the following description, although the two adjacent Y electrode lines are two Y electrode lines consecutively arranged in one direction, the two adjacent Y electrode lines are close to each other, and one or more Y electrode line may be interposed between the two adjacent Y electrode lines.

Hereinafter, a method of detecting the touched position of the touch screen 100 according to embodiments will be described in detail with reference to FIGS. 3 to 11.

Figure 3:
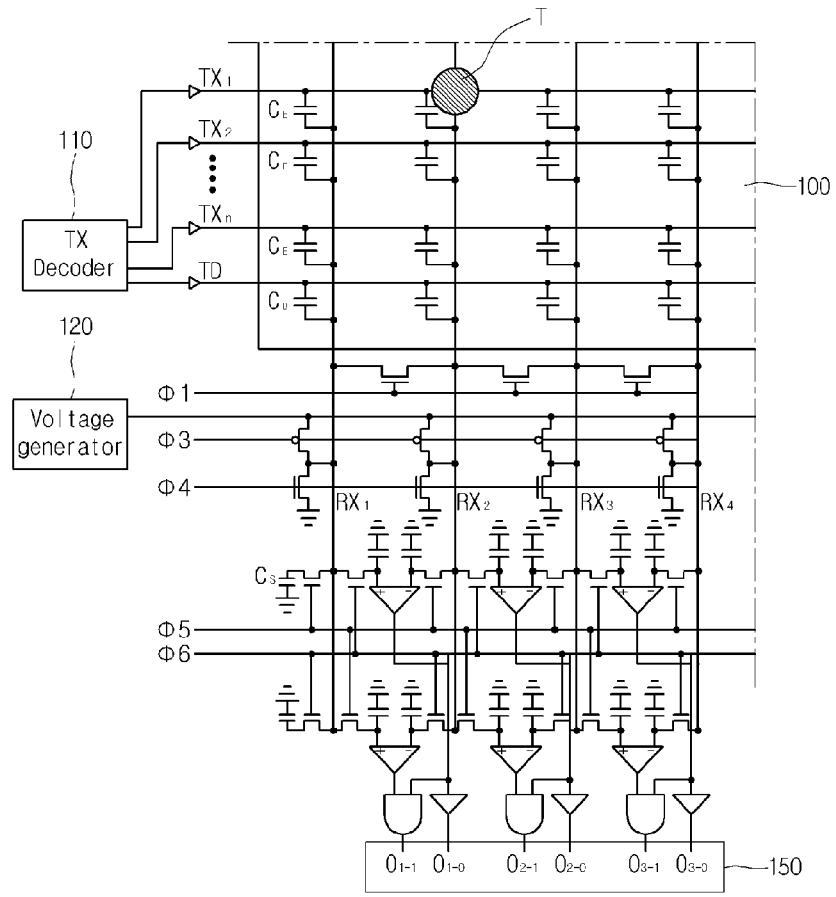
FIGS. 3 to 11 are circuit diagrams showing a method of detecting a touched position of the touch screen according to the embodiments of the disclosure.
Figure 4:
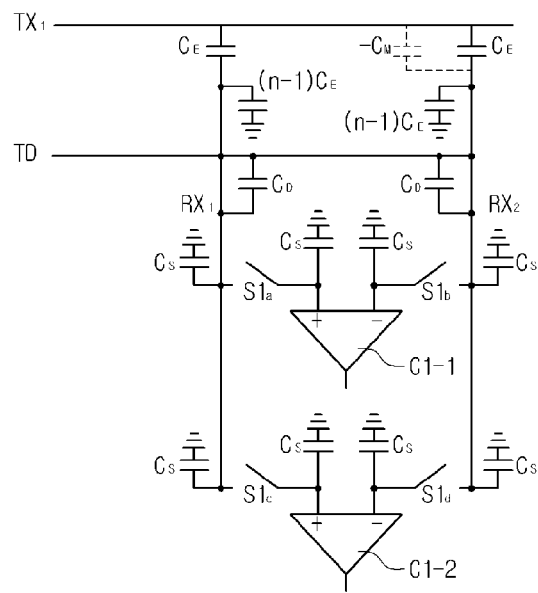
Figure 5:
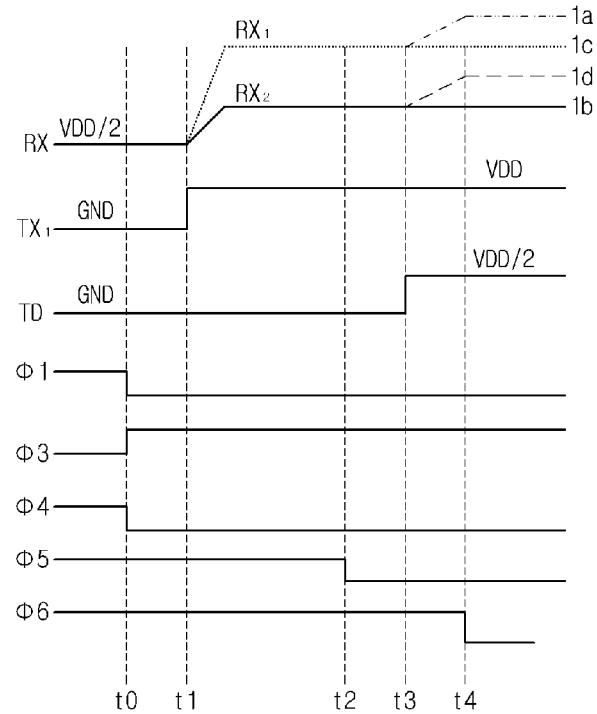
Figure 6:
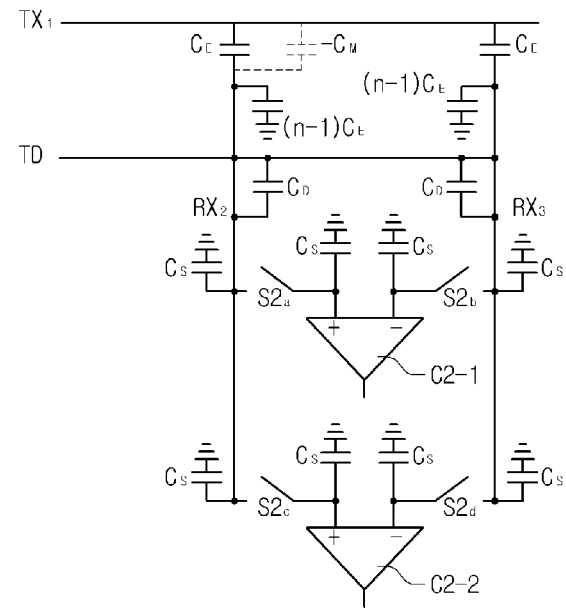

Referring to FIG. 3, when a user touches a cross region T of the X electrode line $TX_1$ and the Y electrode line $RX_2$, the coupling capacitance between the X electrode line $TX_1$ and the Y electrode line $RX_2$ may be reduced from an existing value $C_E$ to a value $C_M$. In other words, the coupling capacitance between the X electrode line $TX_1$ and the Y electrode line $RX_2$ corresponding to the touched position may have a value of $C_E$-$C_M$.

Referring to FIGS. 4 to 7, ground voltage GND is applied to the X electrode lines $TX_1$ to $TX_n$, and voltage $V_{DD}/2$ is applied to the Y electrode lines $RX_1$ to $RX_m$.

To this end, the ground voltage GND is applied other electrode lines TD and ϕ3 extending in a direction to cross the Y electrode lines $RX_1$ to $RX_m$, and voltage $V_{DD}$ is applied to other electrode lines ϕ1, ϕ4, ϕ5, and ϕ6.

The touch panel according to one embodiment of the disclosure may include a TX decoder 110 to apply voltage to the electrode lines as described above, and may include a voltage generator 120 to apply the voltage $V_{DD}/2$.

Thereafter, the ground voltage GND is applied to the electrode lines ϕ1 and ϕ4, and the voltage $V_{DD}$ is applied to the electrode lines ϕ3 at a time point to, so that the X electrode lines $TX_1$ to $TX_n$ and the comparators (i.e., two comparators C1-1 and C1-2 connected between the first Y electrode line $RX_1$ and the second Y electrode line $RX_2$) has a sampling hold voltage level of $V_{DD}/2$.

Next, at the time point t1, if the voltage $V_{DD}$ is applied to the electrode line $TX_1$, the voltages of the electrodes $RX_1$, $RX_2$, and $RX_3$ may be expressed as following Equation 1.

$$V_{RX1}(t1) = \frac{V_{DD}}{2} + \frac{C_E}{nC_E + 4C_S + C_D}V_{DD}$$

$$V_{RX2}(t1) = \frac{V_{DD}}{2} + \frac{(C_E - C_M)}{nC_E - C_M + 4C_S + C_D}V_{DD}$$

$$V_{RX3}(t1) = \frac{V_{DD}}{2} + \frac{C_E}{nC_E + 4C_S + C_D}V_{DD}$$

Equation 1

In Equation 1, $C_E$ represent the capacitance of each capacitor at a cross point between the X electrode line and the Y electrode line, n represents the number of the X electrode lines arranged on the touch screen 100, and $C_m$ represents the negative capacitance formed according to the touch of the finger of the user.

In addition, $C_S$ represents the capacitance of a sampling voltage holding capacitor, and $C_D$ represents the capacitance of a dummy capacitor.

The dummy capacitor $C_D$ includes the same dielectric material as that constituting the capacitor $C_E$ or $C_M$, to reduce the differential signal off-balance caused by the fluctuation of a dielectric parameter.

In order to form the dummy capacitor $C_D$, the electrode line TD and the dummy electrode line TX may be additionally provided, and the ground voltage GND may be applied to the dummy electrode line TX. The dummy capacitor $C_D$ is formed between the electrode line TD and the Y electrode line RX. Meanwhile, although the capacitance formed between the electrode line TD and the dummy electrode line TX does not exert an influence on the signal sensing operation, the dummy electrode line TX acts as an electric field shielding layer with respect to the electrode line TD, so that the capacitance may serve as the capacitance $C_M$ formed between the finger of the user and the Y electrode line RX. When the finger of the user touches a top surface of a glass plate, the electric field is formed between the finger and the Y electrode line RX, so that the electric field is distorted between the X electrode line TX and the Y electrode line RX. Accordingly, the effective capacitance of the capacitor coupled with the Y electrode line RX may be reduced by a value of $C_M$. In this case, the finger acts as a ground electrode. This is because the human body is similar to a huge capacitor.

If the voltage applied to the electrode line ϕ5 is changed to the voltage $V_{DD}$ at the time point t2, a switch S1c is disconnected from the electrode line $RX_1$, switches S1b and S2c are disconnected from the electrode line $RX_2$, and a switch S2b is disconnected from the electrode line $RX_3$.

Accordingly, the capacitors $C_S$ connected to the switches S1b, S1c, S2b and S2c may hold voltages $V_{RX1}(t1)$, $V_{RX2}(t1)$, and $V_{RX3}(t1)$.

Meanwhile, if the voltage applied to the electrode line TD is changed from the ground voltage GND to the voltage $V_{DD}/2$ at the time point t3, the voltages of the electrode lines $RX_1$ $RX_2$, and $RX_3$ may be expressed as Equation 2. Although the voltage applied to the electrode line TD is set to the voltage $V_{DD}/2$, the embodiment is not limited thereto.

$$V_{RX1}(t3) = V_{RX1}(t1) + \frac{C_D}{nC_E + 2C_S + C_D} \frac{V_{DD}}{2}$$

Equation 2

$$V_{RX2}(t3) = V_{RX2}(t1) + \frac{C_D}{nC_E + 2C_S + C_D} \frac{V_{DD}}{2}$$

$$V_{RX3}(t3) = V_{RX3}(t1) + \frac{C_D}{nC_E + 2C_S + C_D} \frac{V_{DD}}{2}$$

If the ground voltage GND is applied to the electrode line φ6 at the time point t4, the switch S1a is disconnected from the electrode line $RX_1$, switches S1d and S2a are disconnected from the electrode line $RX_2$, and the switch S2d is disconnected from the electrode line $RX_3$.

Accordingly, the capacitors $C_S$ connected to the switches S1a, S1d, S2a and S2d may hold voltages $V_{RX1}(t3)$, $V_{RX2}(t3)$ and $V_{RX3}(t3)$.

Therefore, the differences between input levels at comparators C1-1, C1-2, C2-1, and C2-2 may be calculated through following Equation 3.

$$\Delta V_{cmp1-1} = V_{RX1}(t3) - V_{RX2}(t1) = \frac{2C_M + C_D}{nC_E + 2C_S + C_D} \frac{V_{DD}}{2}$$

$$\Delta V_{cmp1-2} = V_{RX1}(t1) - V_{RX2}(t3) = \frac{2C_M - C_D}{nC_E + 2C_S + C_D} \frac{V_{DD}}{2}$$

$$\Delta V_{cmp2-1} = V_{RX2}(t3) - V_{RX3}(t1) = \frac{-2C_M + C_D}{nC_E + 2C_S + C_D} \frac{V_{DD}}{2}$$

$$\Delta V_{cmp2-2} = V_{RX2}(t1) - V_{RX3}(t3) = \frac{-2C_M - C_D}{nC_E + 2C_S + C_D} \frac{V_{DD}}{2}$$

Equation 3

In Equation 3, on the assumption that the capacitances $C_D$ and $C_M$ are equal to each other, the output values of the comparators C1-1, C1-2, C2-1, and C2-2 become 1, 1, 0, and 0.

In this case, output codes used to detect the touched position on the touch screen 100 may be formed by using output values of the comparators C1-1, C1-2, C2-1, and C2-2. For example, as shown in FIG. 1, the logic product (AND) of the output values of the first and second comparators C1-1 and C1-2 may be set as a first value, and the output value of the first comparator C1-1 may be set as a second value.

In detail, the output code $[O_{1-1}, O_{1-0}]$ for the electrode lines $RX_1$ and $RX_2$ may become [1,1], and the output code $[O_{2-1}, O_{2-0}]$ for the electrode lines $RX_2$ and $RX_3$ may become [0,0].

In other words, as the output code of the electrode lines $RX_1$ and $RX_2$ is [1,1], the touched position exists on the electrode line $RX_2$.

Meanwhile, as the output code of the electrode lines $RX_2$ and $RX_3$ is [0,0], the touched position exists on the electrode line $RX_2$.

According to the above method of detecting the touched position, if the output code of two Y electrode lines is [1,1], the determination may be made that the touched position exists on the right Y electrode line of the two Y electrode lines.

In contrast, if the output code of two Y electrode lines is [0,0], the determination may be made that the touched position exists on the left Y electrode line of the two Y electrode lines.

Figure 8:
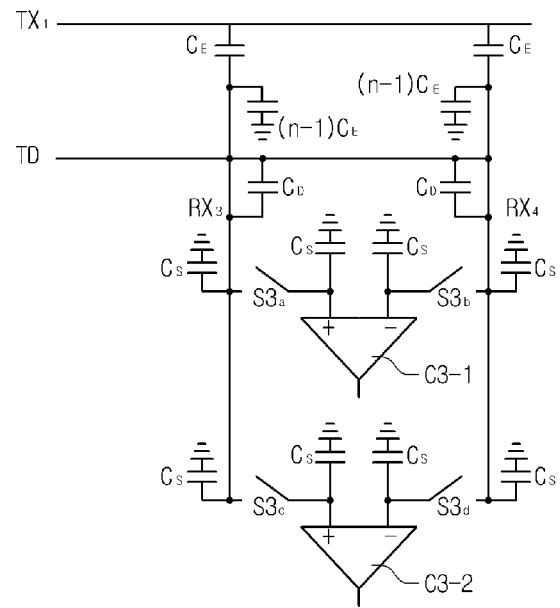
Figure 9:
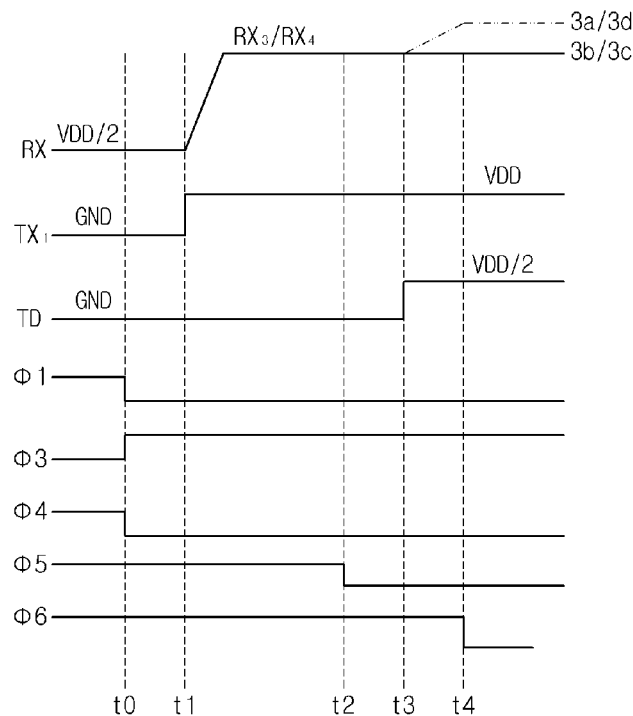
Figure 10:
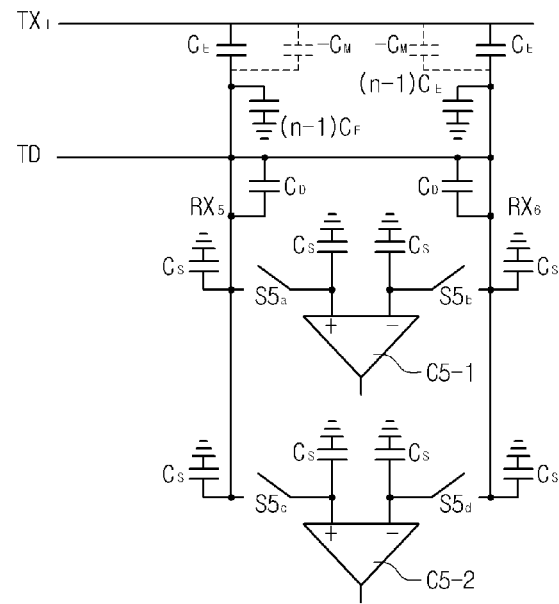
Figure 11:
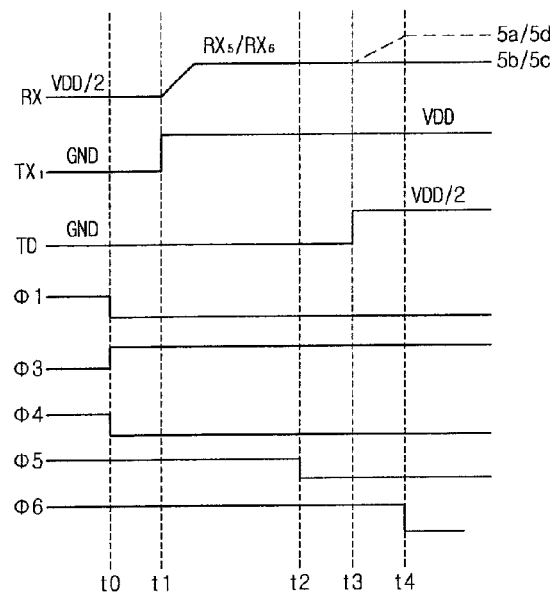

In addition, when the finger of the user does not touch both of two adjacent Y electrode lines as shown in FIGS. 8 and 9, or the finger of the user touches both of two adjacent Y electrode lines as shown in FIGS. 10 and 11, the differences between input levels for the comparators C3-1, C3-2, C5-1, and C5-2 may be expressed following Equation 4.

$$\Delta V_{cmp3-1} = \Delta V_{cmp5-1} = \frac{C_D}{nC_E + 2C_S + C_D} \frac{V_{DD}}{2}$$

$$\Delta V_{cmp3-2} = \Delta V_{cmp5-2} = \frac{-C_D}{nC_E + 2C_S + C_D} \frac{V_{DD}}{2}$$

Equation 4

According to Equation 4, the output code $[O_{3-1}, O_{3-0}]$ of the electrode lines $RX_3$ and $RX_4$, touching the finger of the user is [0,1], and the output code $[O_{5-1}, O_{5-0}]$ of the electrode lines $RX_5$ and $RX_6$, which do not touch the finger of the user, is [0,1]. Accordingly, the two cases may be not distinguished from each other by the output code.

In this case, the touch state for the two adjacent Y electrode lines having the output code of [0,1] may be determined according to the output codes for another adjacent Y electrode lines.

For example, if the output code $[O_{1-1}, O_{1-0}]$ of adjacent Y electrode lines provided at the most left side is [0,0], the touched position exits on the electrode line $RX_1$, and does not exist on the electrode line $RX_3$.

In addition, if the output code $[O_{2-1}, O_{2-0}]$ of next adjacent Y electrode lines is [0,1], the voltage difference between the electrode lines $RX_2$ and $RX_3$ is 0, so that the touched position does not exist on the electrode line $RX_3$. In addition, when the output code $[O_{2-1}, O_{2-0}]$ is [0,1], the touched position does not exist on the electrode line $RX_4$.

Meanwhile, if the output code $[O_{1-1}, O_{1-0}]$ of the adjacent Y electrode lines provided at the most left side is [1,1], the touched position exits on the electrode line $RX_2$, and does not exist on the electrode line $RX_1$.

In addition, if the output code $[O_{2-1}, O_{2-0}]$ of next adjacent Y electrode lines is [0,1], the voltage difference between the electrode lines $RX_2$ and $RX_3$ is 0, so that the touched position exists on the electrode line $RX_3$. In addition, when the output code $[O_{2-1}, O_{2-0}]$ is [0,1], the touched position exists on the electrode line $RX_4$.

In addition, if the output code $[O_{1-1}, O_{1-0}]$ of the adjacent Y electrode lines provided at the most left side is [0,1], the touched position may not exist on both of the electrode lines $RX_1$ and $RX_2$, or may exist on the electrode lines $RX_1$ and $RX_2$.

In this case, it may be assumed that the touched position does not exist until the output code of [0,0] or [1,1] comes.

For example, if the output code $[O_{5-1}, O_{5-0}]$ is [0,0], the touched position exists on all electrode lines $RX_1$ to $RX_5$, and does not exist on the electrode line $RX_6$.

In contrast, if the output code $[O_{5-1}, O_{5-0}]$ is [1,1], the touched position does not exist on all electrode lines $RX_1$ to $RX_5$, and exists on the electrode line $RX_6$.

Meanwhile, if all output codes represent [0,1], the finger of the user touches the touch panel on all Y electrode lines, or does not touch the touch panel. Accordingly, the finger touch of the user may not exist, or the finger of the user may unintentionally touch all points of the touch panel, so that the specific operation according to the touch input may be prevented.

Figure 12:
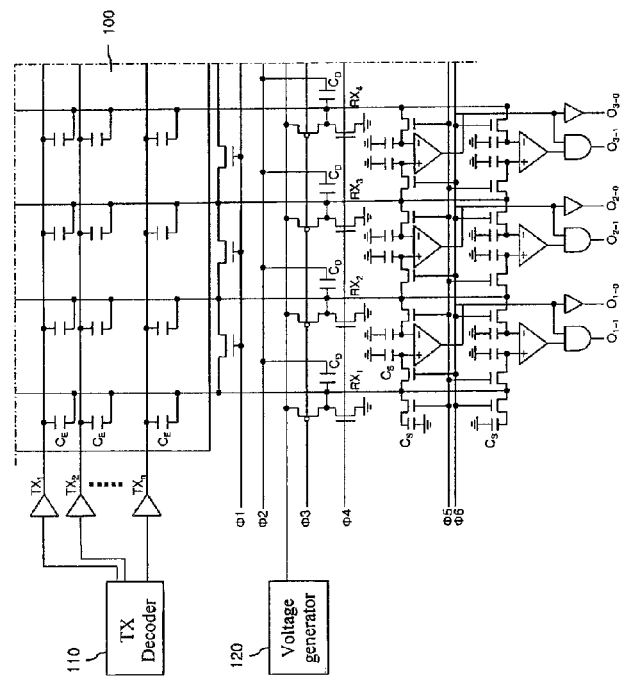
FIG. 12 is a circuit diagram showing the structure of a touch panel according to a second embodiment of the disclosure.

FIG. 12 is a circuit diagram showing the structure of a touch panel according to a second embodiment of the disclosure. The structure and the operations of the touch panel shown in FIG. 12 the same as those of FIGS. 1 to 11 will not be further described below.

Referring to FIG. 12, an electrode line φ2 is added instead of the electrode line TD, and the voltage applied to the electrode line TD is applied to the electrode line φ2, so that the operation of the touch panel the same as that described with reference to FIGS. 1 to 11 may be performed.

In this case, the capacitance variation according to the finger touch of the user at the region for the electrode line TD can be prevented.

Meanwhile, the touch sensitivity may be increased or decreased by changing a TD high level applied to the electrode line TD (or electrode line φ2).

For example, if the high level voltage applied to the electrode line TD is $V_{DD}/2$ as described above, the input voltage differences of the first and second comparators C1-1 and C1-2 may be expressed as following Equation 5.

$$\Delta V_{cmp1-1} = \frac{C_M + 0.5C_D}{nC_E + 2C_S + C_D} V_{DD} \quad \text{Equation 5}$$

$$\Delta V_{cmp1-2} = \frac{C_M - 0.5C_D}{nC_E + 2C_S + C_D} V_{DD}$$

In addition, on the assumption that the capacitance variation $C_M$ according to the finger touch of the user is in the range of 0 to $C_m$, the relations of Equations 5 and 6 are made.

$$\frac{0.5C_m}{nC_E + 2C_S + C_D} V_{DD} \leq \Delta V_{cmp1-1} \leq \frac{1.5C_m}{nC_E + 2C_S + C_D} V_{DD} \quad \text{Equation 6}$$

$$\frac{-0.5C_m}{nC_E + 2C_S + C_D} V_{DD} \leq \Delta V_{cmp1-2} \leq \frac{0.5C_m}{nC_E + 2C_S + C_D} V_{DD}$$

In this case, although the output value of the first comparator C1-1 is 1 regardless of the capacitance $C_M$, the output value of the second comparator C2-1 may have a value of 0 when the capacitance $C_M$ is less than $0.5C_m$.

Meanwhile, when the high level voltage applied to the electrode line TD is $0.2V_{DD}$, the input voltage difference of each of the comparators C1-1 to C1-2 may be expressed as following Equation 7.

$$\Delta V_{cmp1-1} = \frac{C_M + 0.2C_D}{nC_E + 2C_S + C_D} V_{DD} \quad \text{Equation 7}$$

$$\Delta V_{cmp1-2} = \frac{C_M - 0.2C_D}{nC_E + 2C_S + C_D} V_{DD}$$

In addition, on the assumption that the capacitance variation $C_M$ according to the finger touch of the user is in the range of 0 to $C_m$, the relations of Equations 7 and 8 are made.

$$\frac{0.2C_m}{nC_E + 2C_S + C_D} V_{DD} \leq \Delta V_{cmp1-1} \leq \frac{1.2C_m}{nC_E + 2C_S + C_D} V_{DD} \quad \text{Equation 8}$$

$$\frac{-0.2C_m}{nC_E + 2C_S + C_D} V_{DD} \leq \Delta V_{cmp1-2} \leq \frac{0.8C_m}{nC_E + 2C_S + C_D} V_{DD}$$

In this case, although the output value of the first comparator C1-1 is 1 regardless of the capacitance $C_M$, the output value of the second comparator C2-1 may have a value of 0 when the capacitance $C_M$ is less than $0.2C_m$.

In other words, as the high level voltage applied to the electrode line TD is changed from $0.5V_{DD}$ to $0.2V_{DD}$, the threshold of the contact and the non-contact of the finger may be expanded by 60%.

Even in the second and fourth comparators C2-1 and C2-2, the above adjustment of the touch sensitivity may be achieved.

In other words, when the high level voltage applied to the electrode line TD is $V_{DD}/2$, the input voltage difference of each of the third and fourth comparators C2-1 to C2-2 may be expressed as following Equation 9.

$$\frac{-0.5C_m}{nC_E + 2C_S + C_D} V_{DD} \leq \Delta V_{cmp2-1} \leq \frac{0.5C_m}{nC_E + 2C_S + C_D} V_{DD} \quad \text{Equation 9}$$

$$\frac{-1.5C_m}{nC_E + 2C_S + C_D} V_{DD} \leq \Delta V_{cmp2-2} \leq \frac{-0.5C_m}{nC_E + 2C_S + C_D} V_{DD}$$

In addition, when the high level voltage applied to the electrode line ID is $0.2V_{DD}$, the input voltage difference of each of the third and fourth comparators C2-1 to C2-2 may be expressed as following Equation 10.

$$\frac{-0.8C_m}{nC_E + 2C_S + C_D} V_{DD} \leq \Delta V_{cmp2-1} \leq \frac{0.2C_m}{nC_E + 2C_S + C_D} V_{DD} \quad \text{Equation 10}$$

$$\frac{-1.2C_m}{nC_E + 2C_S + C_D} V_{DD} \leq \Delta V_{cmp2-2} \leq \frac{-0.2C_m}{nC_E + 2C_S + C_D} V_{DD}$$

In this case, although the output value of the third comparator C2-1 is 1 regardless of the capacitance $C_M$, the output value of the fourth comparator C2-2 may have a value of 0 when the capacitance $C_M$ is less than $0.2C_m$.

In other words, as the high level voltage applied to the electrode line TD is changed from $0.5V_{DD}$ to $0.2V_{DD}$, the threshold of the contact and the non-contact of the finger may be expanded by 60%.

Meanwhile, when the finger touches or does not touch both of two adjacent Y electrode lines, if the high level voltage applied to the electrode line TD is $0.5V_{DD}$, the input voltage difference of each comparator can be calculated as Equation 11.

$$\Delta V_{cmp3-1} = \Delta V_{cmp5-1} = \frac{0.5C_m}{nC_E + 2C_S + C_D} V_{DD} \quad \text{Equation 11}$$

$$\Delta V_{cmp3-2} = \Delta V_{cmp5-2} = \frac{-0.5C_m}{nC_E + 2C_S + C_D} V_{DD}$$

In addition, when the finger touches or does not touch both of two adjacent Y electrode lines, if the high level voltage applied to the electrode line TD is $0.2V_{DD}$, the input voltage difference of each comparator can be calculated as Equation 12.

$$\Delta V_{cmp3-1} = \Delta V_{cmp5-1} = \frac{0.2C_m}{nC_E + 2C_S + C_D} V_{DD} \quad \text{Equation 12}$$

$$\Delta V_{cmp3-2} = \Delta V_{cmp5-2} = \frac{-0.2C_m}{nC_E + 2C_S + C_D} V_{DD}$$

In Equations 11 and 12, the comparators output the same value regardless of the high level voltage applied to the electrode line TD.

As a result, the touch sensitivity of the finger can be increased by reducing the high level voltage applied to the electrode line TD.

Figure 13:
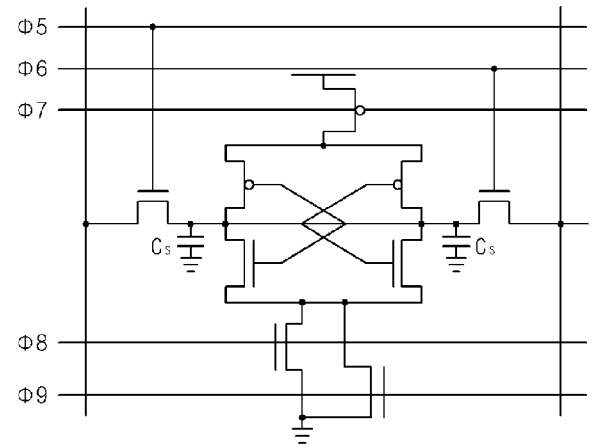
FIG. 13 is a circuit diagram showing the structure of a comparator provided in a touch panel according to one embodiment of the disclosure.
Figure 14:
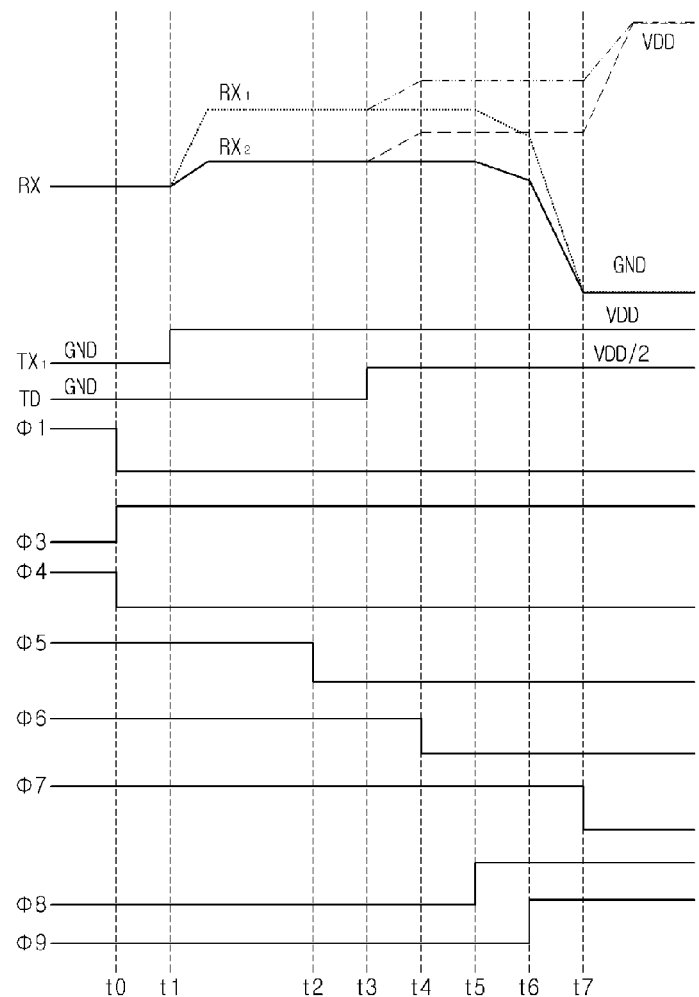
FIG. 14 is a timing diagram showing a method of detecting a touched position of a touch screen according to another embodiment of the disclosure.

FIG. 13 is a circuit diagram showing the structure of a comparator constituting the touch panel according to one embodiment. FIG. 14 is a timing diagram showing a method of detecting the touched position on the touch screen according to another embodiment. The description of the method of detecting the touched position shown in FIG. 14 the same as the description of FIGS. 1 to 12 will not be further made below.

Referring to FIG. 13, a comparator may operate at a time point t5 shown in FIG. 14 after the voltage difference is made at the input terminal of the comparator, and the operation of the comparator may be de-activated until the time point t5 (i.e., t5).

Meanwhile, the control signals (φ5 to φ9) for the comparator follows the timing diagram shown in FIG. 14. The voltage $V_{DD}$ may be applied to the electrode line φ7 until a time point 15, and the ground voltage GND may be applied to the electrode line φ9.

Thereafter, if the voltage $V_{DD}$ is applied to the electrode line φ8 at the time point t5, the operation of the comparator is started, and the operation sequence the same as that of DRAMs is performed.

Although one embodiment of the disclosure has been described with reference to FIGS. 1 to 14 in that two comparators (for example, C1-1 and C1-2) are connected between two Y electrode lines (e.g., $RX_1$ and $RX_2$) consecutively provided in one direction, the disclosure is not limited thereto.

For example, two comparators may be connected between two Y electrode lines (e.g., $RX_1$ and $RX_3$) interposing at least one Y electrode line therebetween.

In detail, when the Y electrode lines provided in line as shown in FIG. 1 are alternately connected to IC chips provided at both sides of the touch screen 100 (for example, the odd Y electrode lines are the first IC chip provided at the left side, and the even Y electrode lines are connected to a second IC chip provided at the right side), two comparators may be connected between the two Y electrode lines adjacent to each other while interposing one Y electrode line.

Meanwhile, although one embodiment of the disclosure has been described in that two comparators are connected between two adjacent Y electrode lines, three or more comparators may be connected between two adjacent Y electrode lines according to another embodiment of the disclosure.

In addition, as the number of comparators connected between two adjacent Y electrode lines is increased, the touch sensitivity to detect the touched position of the touch panel according to the embodiment of the disclosure can be improved.

A driving algorithm related to the operating scheme of the above touch panel is applicable to an IC, and the IC is applicable to a driving chip of the touch panel for the realization.

The IC may include a plurality of comparators having a plurality of input terminals to receive position signals and addition signals varied according to the touched positions and output terminals to output comparative signals of the position signals and the addition signals, and an operating part 150 to generate a position signal by reading the comparative signal out of the comparators.

The comparators include a first comparator and a second comparator connected to each other in parallel. First input terminals are connected to one terminals of the first and second comparators, and second input terminals are connected to opposite terminals of the first and second comparators.

In addition, one of the position signal and the addition signal is input to the first input terminal of the first comparator and the second input terminal of the second comparator, and the other of the position signal and the addition signal is input to the second input terminal of the first comparator and the first input terminal of the second comparator.

In addition, on the assumption that the plural comparators parallel-connected to each other are classified into one group, the operating part 150 may receive comparative signals of an adjacent group of comparators to generate the position signals.

In addition, in order to form the dummy capacitance $C_D$, a capacitor may be mounted on the IC.

For example, the capacitor may include a MOS capacitor.

In addition, the IC may be independently installed in the touch panel or may be integrated in the form of one-chip with at least one of a chip of a personal portable terminal and an LCD driving chip.

Figure 15:
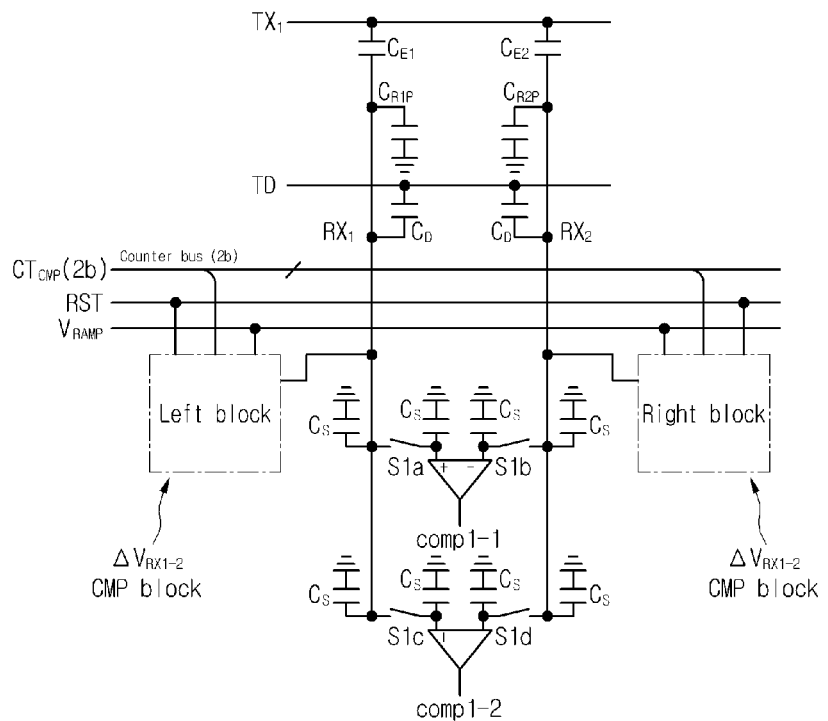
FIG. 15 is a circuit diagram showing a touch panel signal detecting circuit including a CMP block according to the embodiment of the disclosure.
Figure 16:
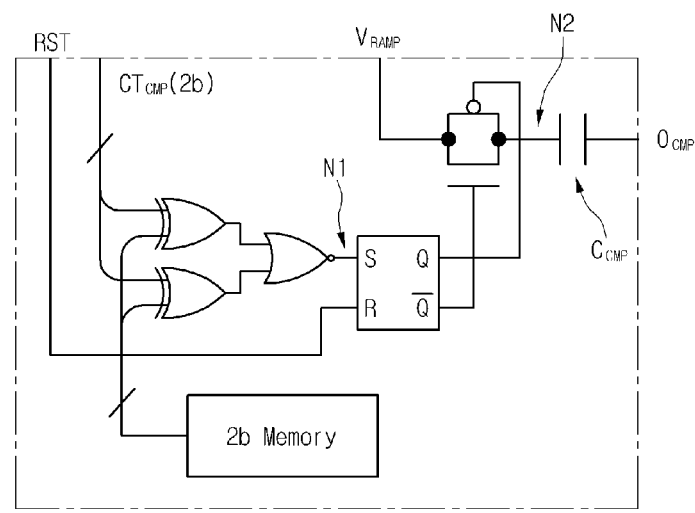
FIG. 16 is a circuit diagram showing an example of a CMP block according to the embodiment of the disclosure.
Figure 17:
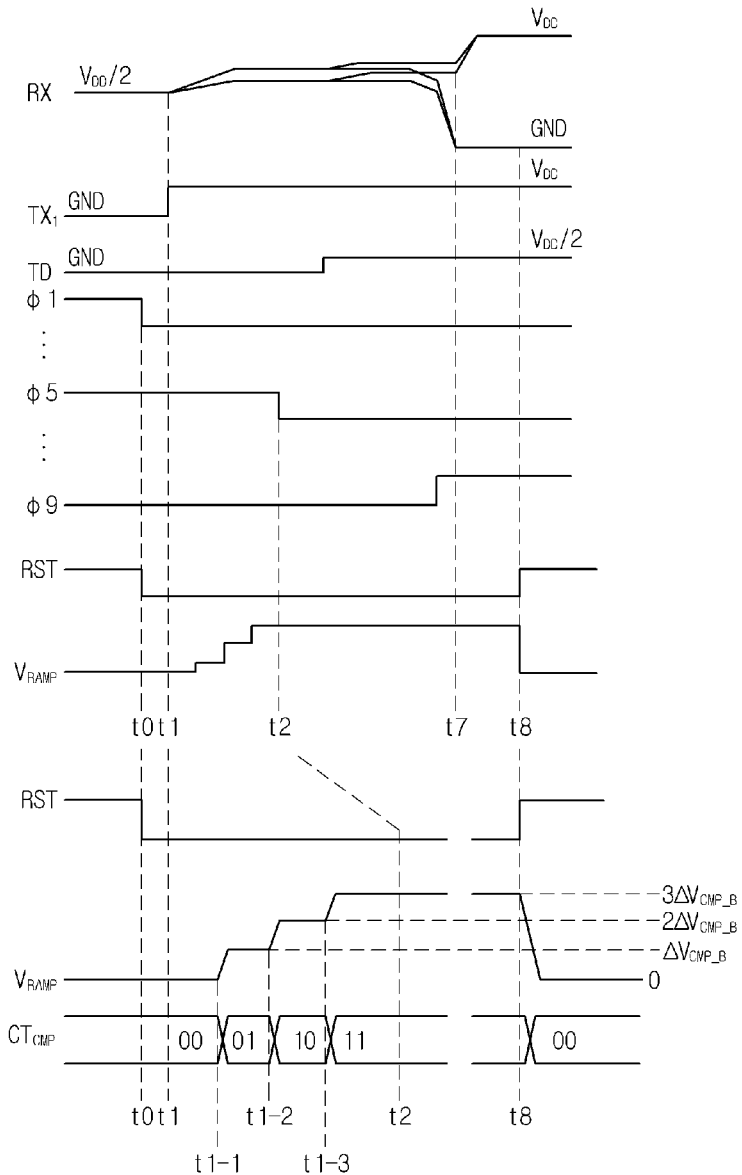
FIGS. 17 and 18 are timing diagrams showing the timing for a control signal of the CMP block in a normal operating mode according to the embodiment of the disclosure.
Figure 18:
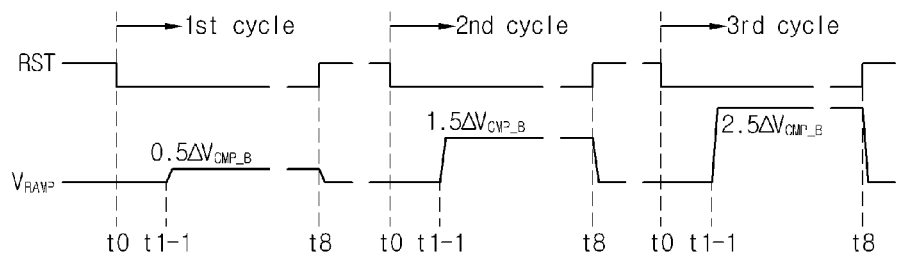

FIG. 15 is a circuit diagram showing a touch panel signal detecting circuit including a CMP block according to another embodiment of the disclosure. FIG. 16 is a circuit diagram showing the CMP block according to another embodiment of the disclosure. FIGS. 17 and 18 are timing diagrams showing the timing of a CMP block control signal in a normal operating mode according to another embodiment of the disclosure.

Referring to FIGS. 15 and 16, signals CTCMP, RST and VRAMP may be input to the CMP block. In addition, the output terminal of the CMP block may be connected to the Y electrode line.

The CMP block includes a logic circuit, and a plurality of XOR gates may be connected to each other in parallel. The XOR gates receive the signal $CT_{CMP}(2b)$ and an output of a 2b memory, and the outputs of the XOR gates may be connected to inputs of a NOR gate.

The output of the NOR gate is input to an input S of an RS latch circuit, and a signal RST grounded after t0 may be input to an input R of the RS latch circuit. N2 may be determined according to the combination of the inputs S and R of the RS latch circuit.

Referring to FIG. 17, before t0, the ground voltage GND is applied to the X electrode lines $TX_1$ to $TX_n$, and the voltage $V_{DD}/2$ is applied to the Y electrode lines $RX_1$ to $RX_m$.

To this end, the ground voltage GND may be applied to the electrode lines TD and φ9 provided in a direction to cross the Y electrode lines $RX_1$ to $RX_m$.

The touch panel according to one embodiment of the disclosure includes a TX decoder 110 to apply voltage to electrode lines as described above, and a voltage generator 120 to apply voltage $V_{DD}/2$.

Thereafter, the ground voltage GND is applied to the electrode lines φ1 and RST at the time point t0, so that the X electrode lines $TX_1$ to $TX_n$ and the comparators (i.e., two comparators C1-1 and C1-2 connected between the first Y electrode line $RX_1$ and the second Y electrode line $RX_2$) has a sampling hold voltage level of $V_{DD}/2$.

Thereafter, at the time point t1, if the voltage $V_{DD}$ is applied to the X electrode line TX1, voltages of the Y electrode lines $RX_1$ and $RX_2$ are boosted by capacitances $C_{E1}$ and $C_{E2}$. The CE represents the capacitance of each coupling capacitor at a cross region between the X electrode line and the Y electrode line.

Ideally, the coupling capacitors at cross regions between the X electrode lines and the Y electrode lines are the same. However, actually, the coupling capacitors are not the same. Accordingly, the voltage difference $\Delta V_{RX1-2}$ is made between the first Y electrode line $RX_1$ and the second electrode line $RX_2$.

The voltage difference $\Delta V_{RX1-2}$ may be made due to the coupling capacitances $C_{E1}$ and $C_{E2}$ and/or the parasitic capacitance of the electrode line RX caused by the difference between CR1P and CR2P, and all non-symmetric structures.

Since the reliability of the touch panel may be reduced due to the voltage difference $\Delta V_{RX1-2}$, a compensation (CMP) block for the voltage difference $\Delta V_{RX1-2}$ ($\Delta V_{RX1-2}$ CMP block) is formed at each of the electrode lines RX1 and RX2 in order to reduce the voltage difference $\Delta V_{RX1-2}$.

The $\Delta V_{RX1-2}$CMP block can add values of 0, $\Delta V_{CMP}$, $2\Delta V_{CMP}$, and $3\Delta V_{CMP}$ to values $V_{RX1}$ and $V_{RX2}$ in a 2b (bit) system. In a 3b system, the voltage difference can be compensated in 8 steps from 0 to $7\Delta V_{CMP}$.

Figure 7:
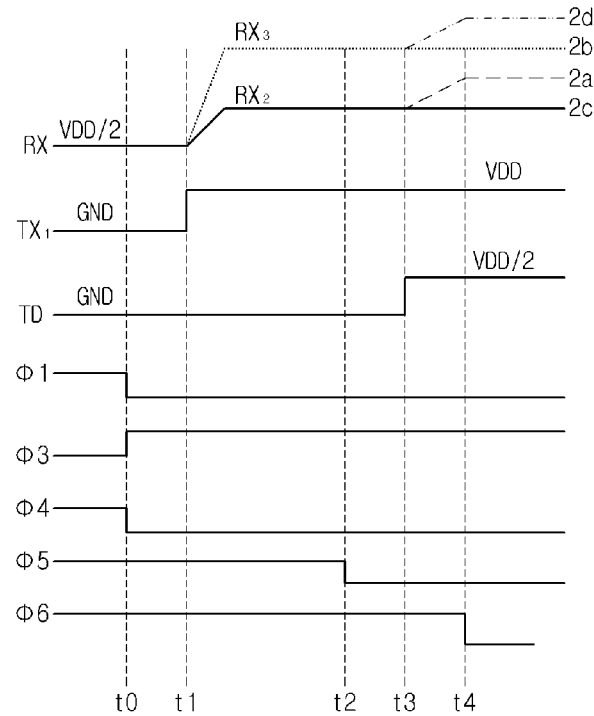

A 2b CMP code may be created before a normal touch sensing operation is performed, and stored in a memory as shown in FIG. 7.

In the normal touch sensing operation mode, compensation voltages for the voltage difference $\Delta V_{RX1-2}$ added to voltages $V_{RX1}$ and $V_{RX2}$ are as follows.

If $\Delta V_{RX1-2}=2.5\Delta V_{CMP}$, that is, $V_{RX1}=V_{RX2}+2.5\Delta V_{CMP}$, voltage of $3\Delta V_{CMP}$ is added to the voltage $V_{RX2}$. In this case, the $\Delta V_{CMP}$ is a preset value, and may be varied according to circuits. Similarly to the above Equation, compensation voltages are added as follows.

If $1.5\Delta V_{CMP}=\Delta V_{RX1-2} < 2.5\Delta V_{CMP}$, the value of $2\Delta V_{CMP}$ is added to the voltage $V_{RX2}$.

If $10.5\Delta V_{CMP}=\Delta V_{RX1-2} < 1.5\Delta V_{CMP}$, the value of $\Delta V_{CMP}$ is added to the voltage $V_{RX2}$.

If $-0.5\Delta V_{CMP}=\Delta V_{RX1-2} < 0.5\Delta V_{CMP}$, no value is added to the voltage VRX2.

If $-1.5\Delta V_{CMP}=\Delta V_{RX1-2} < -0.5\Delta V_{CMP}$, the value of $2\Delta V_{CMP}$ is added to the voltage VRX1.

If $-2.5\Delta V_{CMP}=\Delta V_{RX1-2} < -1.5\Delta V_{CMP}$, the value of $2\Delta V_{CMP}$ is added to the voltage VRX1.

If $\Delta V_{RX1-2} < -2.5\Delta V_{CMP}$, the value of $3\Delta V_{CMP}$ is added to the voltage VRX1.

The $\Delta V_{RX1-2}$ CMP block may be formed at each Y electrode line.

Hereinafter, the process of generating an output of the $\Delta V_{RX1-2}$CMP block will be described. For the explanation purpose, it is assumed that the $\Delta V_{RX1-2}$CMP block is formed at the electrode line RX1 if a CMP code is 00.

The relationship between the compensation voltage $\Delta V_{CMP}$ and the output voltage $\Delta V_{CMP\_B}$ of the CMP block may be expressed as following Equation 13.

$$\Delta V_{CMP_B} = \frac{C_{PRX} + C_{CMP}}{C_{CMP}} \Delta V_{CMP} \qquad \text{Equation 13}$$

In Equation 13, $C_{CMP}$ represents the internal capacitance of the $\Delta VRX1-2$ CMP block as shown in FIG. 16. In addition, $C_{PRX}$ represents the parasitic capacitance formed at the Y electrode line.

In a stand-by state, that is, a state before t0, since the RST represents a high (H) signal and the $V_{RMAP}$ is 0V, the voltage at a node N2 is 0V.

As shown in FIG. 17, the voltage $V_{RAMP}$ is increased to $\Delta V_{CMP\_B}$, $2\Delta V_{CMP\_B}$, and $3\Delta V_{CMP\_B}$ at times t1-1, t1-2, and t1-3, respectively.

Next, regarding the time point t0, if the 2b CMP code is 00, the node N1 becomes at a state of H. In addition, the ports S, R, and Q are in the state of H, and the port Q-bar is in the state of L. In the ports Q and Q-bar, the states of H and L are not inverted until the time point t8. In other words, if the terminal RST becomes at the level of H, the port Q becomes at the state of L, and the port Q-bar becomes at the state of H. Since a transfer gate is off, the output voltage of the node N2 becomes 0V, so that voltage is not changed.

Thereafter, at time t1-1, the voltage $V_{RAMP}$ is increased to $\Delta V_{CMP\_B}$, and the voltage of the node N2 is increased to $\Delta V_{CMP\_B}$, so that the voltage $V_{RX2}$ is increased by the $\Delta V_{CMP}$. If the 2b CMP is 01, the node N1 becomes at the state of H, the ports S, R, and Q becomes at the state of H, and the port Q-bar becomes at the state of L. Since the transfer gate switch is turned off, and the $\Delta VCMP\_B$ is held at the node N2, the electrode line $RX_2$ has values of $V_{RX2}$ and $\Delta VCMP$.

If the 2b CMP is not 01, the node N1 is held at the state of L, the ports S, R, and Q become at the state of L, and the port Q-bar becomes at the state of H.

Similarly, the values of $2\Delta V_{CMP}$ and $3\Delta V_{CMP}$ may be added to the voltage VRX2 according to the CMP code.

Hereinafter, the process of creating the CMP code will be described with reference to FIG. 18.

In the normal touch sensing operating mode, the value of the $V_{RAMP}$ is sequentially increased from 0V to $3\Delta V_{CMP\text{-}B}$. In a CMP code creating mode, the value of $V_{RAMP}$ is increased one time at one sequence period. In other words, the value of $V_{RAMP}$ is increased to one of $0.5\Delta V_{CMP\text{-}B}$, $1.5\Delta V_{CMP\text{-}B}$, and $2.5\Delta_{VCMP\text{-}B}$ from 0V.

As shown in FIG. 18, the value of $V_{RAMP}$ is increased from 0V to $0.5\Delta V_{CMP\text{-}B}$ at a first sequence period. The value of $V_{RAMP}$ is increased from 0V to $1.5\Delta V_{CMP\text{-}B}$ at a second sequence period. The value of $V_{RAMP}$ is increased from 0V to $2.5\Delta V_{CMP\text{-}B}$ at a second sequence period.

According to the present embodiment, the value of the $V_{RAMP}$ is changed from 0V to $0.5\Delta V_{CMP\text{-}B}$ at the first sequence period, changed from 0V to $1.5\Delta V_{CMP\text{-}B}$ at the second sequence period, and changed from 0V to $2.5\Delta V_{CMP\text{-}B}$ at the third sequence period.

At the first sequence period, the value of the $V_{RAMP}$ is increased from 0V to $0.5\Delta V_{CMP\text{-}B}$. The comparator C1-1 compares the value $V_{RX1}$ with the value $V_{RX2}+0.5\Delta VCMP$. The comparator C1-2 compares the value $V_{RX2}$ with the value $V_{RX1}+0.5\Delta VCMP$.

At the second sequence period, the comparator C1-1 compares the value VRX1 with the value $V_{RX2}+1.5\Delta V_{CMP}$. The comparator C1-2 compares the value VRX2 with the value $V_{RX1}+1.5\Delta V_{CMP}$.

At the third sequence period, the comparator C1-1 compares the value VRX1 with the value $V_{RX2}+2.5\Delta V_{CMP}$. The comparator C1-2 compares the value VRX2 with the value $V_{RX1}+2.5\Delta VCMP$.

If $V_{RX1} > V_{RX2}+2.5\Delta V_{CMP}$, the comparators C1-1 and C1-2 output the code of 11 at each sequence period.

If $V_{RX1} \approx V_{RX2}+2.5\Delta V_{CMP}$, the comparators C1-1 and C1-2 output the code of 11 at the first and third sequence periods, but outputs one of codes 00, 10, 01, and 11. In other words, at the third sequence period, the output code value is unpredictable. The code of 11 is previously output at the second sequence period. Accordingly, if the code of 10 or 00 is output at the third sequence period, $V_{RX1} \approx V_{RX2}+2.5?V_{CMP}$. If the code of 11 or 01 is output at the third sequence period, the situation of $V_{RX1} \approx V_{RX2}+2.5\Delta V_{CMP}$ may be erroneously regarded as $\Delta V_{RX1-2} > 2.5\Delta V_{CMP}$ or $1.5\Delta V_{CMP} < \Delta V_{RX1-2} < 2.5\Delta V_{CMP}$. However, since the problem occurs in a boundary region, the problem does not exert a great influence on the touch sensitivity.

If $1.5\Delta V_{CMP} < \Delta V_{RX1-2} < 2.5\Delta V_{CMP}$, the comparators C1-1 and C1-2 output the code of 11 at the first and second sequence periods, and output the code of 01 at the third sequence period.

If $\Delta V_{RX1-2} \approx 1.5\Delta V_{CMP}$, the comparators C1-1 and C1-2 output the code of 11 at the first sequence period, and the code of 01 is output at the third sequence period. In addition, one of codes 11, 10, 01, and 00 may be output at the second sequence period.

If $0.5\Delta V_{CMP} < \Delta V_{RX1-2} < 1.5\Delta V_{CMP}$, the comparators C1-1 and C1-2 output the code of 11 at the first sequence period, and output the code of 01 at the second and third sequence periods.

If $\Delta V_{RX1-2} \approx 0.5\Delta V_{CMP}$, the comparators C1-1 and C1-2 output the code of 01 at the second and third sequence periods, and output one of codes 11, 10, 01 and 00 at the first sequence period.

If $-0.5 < \Delta V_{CMP} < \Delta V_{RX1-2} < 0.5\Delta V_{CMP}$, the comparators C1-1 and C1-2 output the code of 01 at each sequence period.

If $\Delta V_{RX1-2} \approx -0.5\Delta V_{CMP}$, the comparators C1-1 and C1-2 output the code of 01 at the second and third sequence periods, and may output one of codes 11, 10, 01 and 00 at the first sequence period.

If $-1.5\Delta V_{CMP} < \Delta V_{RX1-2} < -0.5\Delta V_{CMP}$, the comparators C1-1 and C1-2 output the code of 00 at the first sequence period, and output the code of 01 at the second and third sequence periods.

If $\Delta V_{RX1-2} \approx -1.5\Delta V_{CMP}$, the comparators C1-1 and C1-2 output the code of 00 at the first sequence period, output the code of 01 at the third sequence period, and output one of codes 11, 10, 01 and 00 at the second sequence period.

If $-2.5\Delta V_{CMP} < \Delta V_{RX1-2} < -1.5\Delta V_{CMP}$, the comparators C1-1 and C1-2 output the code of 00 at the first and second sequence periods, and output the code of 01 at the third sequence period.

If $\Delta V_{RX1-2} \approx -1.5\Delta V_{CMP}$, the comparators C1-1 and C1-2 output the code of 00 at the first and second sequence periods, and may output one of codes 11, 10, 01 and 00 at the third sequence period.

If $\Delta V_{RX1-2} < -2.5\Delta V_{CMP}$, the comparators C1-1 and C1-2 output the code of 00 at each sequence period.

The determination of $\Delta V_{RX1-2}$ based on the code value may be achieved based on the code value.

If $\Delta V_{RX1-2} = 2.5\Delta V_{CMP}$, all code output values at the first to third sequence periods is 11. In this case, in order to reduce the voltage difference, a voltage is not added to the voltage $V_{RX1}$, but the voltage of $3\Delta V_{CMP}$ is added to the voltage $V_{RX2}$ in the normal operating mode. In FIG. 15, the 2b memory in a left block connected to the electrode line $R_{X1}$ outputs the code of 00, and the 2b memory in a right block connected to the electrode line $R_{X2}$ output the code of 11.

If $1.5\Delta V_{CMP} = \Delta V_{RX1-2} < 2.5\Delta V_{CMP}$, the code output value is 11 at the first and second sequence periods, and the code output value is not 11 at the third sequence period. In this case, the voltage is not added to the voltage $V_{RX1}$, and the voltage of $2\Delta V_{CMP}$ is added to the voltage $V_{RX2}$. The 2b memory in the left block connected to the electrode line $R_{X1}$ outputs the code of 00, and the 2b memory in the right block connected to the electrode lines $R_{X2}$ outputs the code of 10.

If $0.5\Delta V_{CMP} = \Delta V_{RX1-2} < 1.5\Delta V_{CMP}$, the code output value is 11 at the first sequence period, and the code output value is not 11 at the second sequence period. In this case, the output value at the third sequence period is 01. In this case, the voltage is not added to the voltage $V_{RX1}$, but the voltage $\Delta V_{CMP}$ is added to the voltage $V_{RX2}$. The 2b memory in the left block connected to the electrode line $R_{X1}$ outputs the code of 00, and the 2b memory in the right block connected to the electrode lines $R_{X2}$ outputs the code of 01.

If $-0.5\Delta V_{CMP} < \Delta V_{RX1-2} < 0.5\Delta V_{CMP}$, the code output value is 01 or 10 at the first sequence period, the code output value is 01 at the second sequence period, and the code output value is 01 at the third sequence period. In this case, the voltage is not added to the voltages $V_{RX1}$ and $V_{RX2}$. The 2b memory in the left block connected to the electrode line $R_{X1}$ outputs the code of 00, and the 2b memory in the right block connected to the electrode lines $R_{X2}$ outputs the code of 00.

If $-1.5\Delta VCMP < \Delta V_{RX1-2} = -0.5\Delta V_{CMP}$, the code output value is 00 at the first sequence period, the code output value is not 00 at the second sequence period, and the code output value is 01 at the third sequence period. In this case, the voltage $V_{CMP}$ is added to the voltage $V_{RX1}$, but the voltage is not added to the voltage $V_{RX2}$. The 2b memory in the left block connected to the electrode line $R_{X1}$ outputs the code of 01, and the 2b memory in the right block connected to the electrode lines $R_{X2}$ outputs the code of 00.

If $-2.5\Delta V_{CMP} < \Delta V_{RX1-2} = -1.5\Delta V_{CMP}$, the code output value is 00 at the first sequence period, the code output value is 00 at the second sequence period, and the code output value is not 00 at the third sequence period. In this case, the voltage $2\Delta V_{CMP}$ is added to the voltage $V_{RX1}$, but the voltage is not added to the voltage $V_{RX2}$. The 2b memory in the left block connected to the electrode line $R_{X1}$ outputs the code of 10, and the 2b memory in the right block connected to the electrode lines $R_{X2}$ outputs the code of 00.

If $\Delta V_{RX1-2} = -2.5\Delta V_{CMP}$, the code output value is 00 at the first sequence period, the code output value is 00 at the second sequence period, and the code output value is 00 at the third sequence period. In this case, the voltage $3\Delta V_{CMP}$ is added to the voltage $V_{RX1}$, but the voltage is not added to the voltage $V_{RX2}$. The 2b memory in the left block connected to the electrode line $R_{X1}$ outputs the code of 11, and the 2b memory in the right block connected to the electrode lines $R_{X2}$ outputs the code of 00.

The above description is made based on a system having two X electrode lines RX, and the description of a system having at least two X electrode lines RX will be made below.

A case in which the voltage $\Delta V_{CMP}$ is added to the voltage $V_{RX2}$ if $0.5\Delta V_{CMP} < \Delta V_{RX1-2} = 1.5\Delta V_{CMP}$ has been described. In this case, if $-1.5\Delta V_{CMP} = \Delta V_{RX2-3} < -0.5\Delta V_{CMP}$, the voltage $\Delta V_{CMP}$ is added to the voltage $V_{RX2}$, and the voltage is not added to the voltage $V_{RX3}$. In other words, the voltage is not added to the voltage $VR_{X1}$, the voltage $\Delta V_{CMP}$ is added to the voltage $V_{RX2}$, and the voltage is not added to the voltage $V_{RX2}$.

In addition, for example, if $0.5\Delta V_{CMP} < \Delta V_{RX1-2} = 1.5\Delta V_{CMP}$ and $0.5\Delta V_{CMP} < \Delta V_{RX2-3} = 1.5\Delta V_{CMP}$, the voltage is not added to the voltage $V_{RX1}$, the voltage $\Delta V_{CMP}$ is added to the voltage $V_{RX2}$, and the voltage $\Delta V_{CMP}$ is added to the voltage $V_{RX3}$. As described above, the disclosure is applicable to at least electrode lines.

The method of detecting the touched position of the touch panel according to the disclosure as described above may be prepared as a program executable by a computer and stored in computer-readable recording media. The computer-readable recording media include a ROM, a RAM, a CD-ROM, a magnetic table, a floppy disk, and an optical data storing device, and include a device realized in the form of a carrier wave (for example, transmission over the Internet).

The computer-readable recording media are distributed into computer systems connected to each other through a network to store computer-readable codes through a distribution scheme so that the computer-readable codes may be executed. In addition, function programs, codes, and code segments used to realize the method can be easily deduced by programmers in the art to which the disclosure pertains.

Although a preferred embodiment of the disclosure has been described for illustrative purposes, those skilled in the art will appreciate that various modifications, additions and substitutions are possible, without departing from the scope and spirit of the invention as disclosed in the accompanying claims.

The invention claimed is:

1. A touch panel comprising:
a plurality of comparators having a plurality of input terminals to receive an addition signal and an input position signal varied according to a touched position and an output terminal to output a comparative signal of the input position signal and the addition signal; and
an operating part to generate an output position signal by reading the comparative signal out of each comparator, wherein the comparators are parallel-connected to each other and are grouped in one group, the operating part receives comparative signals of the comparators belonging to an adjacent another group to generate the output position signal.

2. The touch panel of claim 1, wherein each comparator comprises first and second comparators, a first input terminal is connected to a first end of the first and second comparators, and a second input terminal is connected to a second end of the first and second comparators.

3. The touch panel of claim 2, wherein one signal of the input position signal and the addition signal is input to the first input terminal of the first comparator and the second input terminal of the second comparator, and a remaining signal of the input position signal and the addition signal is input to the second input terminal of the first comparator and the first input terminal of the second comparator.

4. The touch panel of claim 1, wherein the plurality of comparators is connected between a first electrode lines and a second electrode lines.

5. The touch panel of claim 4, wherein the plurality of comparators comprising two comparators and the two comparators connected to each other in parallel.

6. The touch panel of claim 5, wherein a '+' input port of the second comparator and a '−' input port of the first comparator are input the voltage of the first electrode line and the second electrode line at a first time point, and the '+' input port of the first comparator and the '−' input port of the second comparator are input the voltage of the first electrode line and the second electrode line at a second time point.

* * * * *